(12) United States Patent
Davis et al.

(10) Patent No.: US 8,176,126 B2
(45) Date of Patent: May 8, 2012

(54) SYSTEM, METHOD AND PROGRAM TO LIMIT RATE OF TRANSFERRING MESSAGES FROM SUSPECTED SPAMMERS

(75) Inventors: John Fred Davis, Durham, NC (US); Kevin David Himberger, Durham, NC (US); Clark Debs Jeffries, Chapel Hill, NC (US); Garreth Joseph Jeremiah, North York (CA)

(73) Assignee: International Business Machines Corporation, Armonk, NY (US)

( * ) Notice: Subject to any disclaimer, the term of this patent is extended or adjusted under 35 U.S.C. 154(b) by 2546 days.

(21) Appl. No.: 10/926,641

(22) Filed: Aug. 26, 2004

(65) Prior Publication Data

US 2006/0047769 A1 Mar. 2, 2006

(51) Int. Cl.
*G06F 15/16* (2006.01)
*G06F 15/173* (2006.01)

(52) U.S. Cl. ........................................ 709/206; 709/224
(58) Field of Classification Search .......................... None
See application file for complete search history.

(56) References Cited

U.S. PATENT DOCUMENTS

| | | | | |
|---|---|---|---|---|
| 6,163,802 A | 12/2000 | Lin et al. | | 709/217 |
| 6,189,035 B1 | 2/2001 | Lockhart et al. | | 709/229 |
| 6,266,692 B1 | 7/2001 | Greenstein | | 709/206 |
| 6,339,784 B1 * | 1/2002 | Morris et al. | | 709/204 |
| 6,484,197 B1 | 11/2002 | Donohue | | 709/206 |
| 6,507,866 B1 | 1/2003 | Barchi | | 709/207 |
| 7,117,358 B2 * | 10/2006 | Bandini et al. | | 713/153 |
| 7,203,749 B2 * | 4/2007 | Hiraga | | 709/224 |
| 7,249,175 B1 * | 7/2007 | Donaldson | | 709/225 |

(Continued)

FOREIGN PATENT DOCUMENTS

JP 2003143182 A 4/2003

OTHER PUBLICATIONS

Lisa 2002 Paper "Spam Blocking With a Dynamically Updated Firewall Ruleset" Deeann M. M. Mikula, Christ Tracy, and Mike Hooling—Telerama Public Access Internet pp. 13-20.

*Primary Examiner* — David England
(74) *Attorney, Agent, or Firm* — Arthur J. Samodovitz

(57) ABSTRACT

A system, method and program product for managing e-mails from a source suspected of sending spam. The e-mails are received at a firewall or router en route to a mail server. A determination is made whether a source has sent an e-mail which exhibits characteristics of spam. In response, subsequent e-mails from the source destined for the mail server are rate-limiting at the firewall or router such that the firewall or router limits a rate at which the subsequent e-mails are forwarded from the firewall or router to the mail server. The rate is predetermined and less than a maximum rate at which the firewall or router can physically forward e-mails to the mail server absent the rate limit. A determination is made whether another source has sent another e-mail which exhibits more characteristics of spam than the first said e-mail. In response, subsequent e-mails from this other source are blocked at the firewall or router. The rate limit can be a limit on a number of e-mails per unit of time from the source that will be forwarded from the firewall or router to the mail server.

15 Claims, 4 Drawing Sheets

U.S. PATENT DOCUMENTS

| | | | |
|---|---|---|---|
| 7,346,700 B2* | 3/2008 | Gould et al. | 709/232 |
| 2002/0052919 A1* | 5/2002 | Morris et al. | 709/205 |
| 2003/0236847 A1* | 12/2003 | Benowitz et al. | 709/206 |
| 2005/0120118 A1* | 6/2005 | Thibadeau | 709/228 |
| 2005/0160148 A1* | 7/2005 | Yu | 709/206 |
| 2005/0188028 A1* | 8/2005 | Brown et al. | 709/206 |
| 2006/0059238 A1* | 3/2006 | Slater et al. | 709/206 |
| 2007/0005970 A1* | 1/2007 | Trupp et al. | 713/170 |

* cited by examiner

SYSTEM, METHOD AND PROGRAM TO LIMIT RATE OF TRANSFERRING MESSAGES FROM SUSPECTED SPAMMERS

FIELD OF THE INVENTION

The invention relates generally to computer systems, and deals more particularly with a technique to reduce the impact of spam on a mail server.

BACKGROUND OF THE INVENTION

The Internet is well known today, and comprises a vast number of user computers and servers interconnected via routers, firewalls and networks. One role of the Internet is to provide a medium to exchange e-mail. A common problem today is "spam", where a source server sends commercial e-mails via the Internet to numerous (thousands, even millions of) user computers via the user's mail servers. Each mail server provides an e-mail transfer function for multiple user computers. The spam clogs the Internet, mail servers and mail boxes of the user computers. Some mail servers may be so busy handling the spam, that they have little time to handle/transfer legitimate e-mail. As a result, the legitimate e-mail is handled very slowly.

It is known that an enterprise's intranet can be protected with a firewall. The firewall may be located between the enterprise's mail server and the Internet. The firewall can be programmed to block e-mail from source IP addresses of likely spam servers. Spam detectors and filters are well known today such as "Spam-Assassin" (trademark of Apache Software Foundation) program. Typically, the spam detector and filter are installed at an edge router or a firewall for a mail server. The spam detector reviews incoming e-mail and calculates a "spam likelihood score" for each e-mail based on its characteristics and the weight of each characteristic. These characteristics include (a) key words characteristic or marketing material such as "free"and "real-estate", etc. (b) whether the e-mail is HTML type, (c) whether the e-mail is malformed HTML type (which is more characteristic of marketing material than carefully written HTML), (d) whether the e-mail text omits the first or last name of the intended recipient, (e) whether the subject line is blank or has certain words characteristic of marketing, (f) whether the identity listed in the "from" field matches the location of the source IP address, (g) whether the e-mail includes colors, (h) whether the e-mail has some text in larger font than ordinarily used for noncommercial e-mail, and (i) whether the text is similar to or identical with other e-mails from the same source. A known spam detector can also consider when multiple, similar e-mails (i.e. the same or substantially the same text or the same subject) are addressed to multiple different recipients/users and originate from the same source IP address. The spam detector would ignore e-mails sent from known, legitimate sources, such as e-mails from employees of the same corporation to which the e-mails are sent; these e-mails are not considered to be spam. The legitimate sources may be found in a list supplied by a system administrator, and accessible to the spam detector. If the spam likelihood score exceeds a predetermined upper threshold, then the e-mail is very likely to be spam. In such a case, the spam detector reads the IP address of the sender, and then blocks subsequent e-mails from the same IP address and/or e-mail address by creating a corresponding spam filter rule. Each spam filter rule may specify a source IP address and/or e-mail address from which e-mail will not be accepted. The spam filter rule is enforced at the firewall or router, or a gateway server in the absence of a firewall or router. The spam filter rule may be in effect indefinitely or for a predetermined amount of time, but can be periodically removed when there are too many filters to efficiently handle.

A problem with the foregoing spam blocking technique is that some e-mails are erroneously presumed to be spam based on their spam likelihood score or other factors. For example, a CEO or customer of a corporation may send an e-mail from an unrecognized computer to a large number of employees of the same corporation. In such a case, the known spam detector may presume the e-mail to be spam, and block it.

An object of the present invention is to better manage suspected spam which may actually be legitimate e-mail.

SUMMARY

The invention resides in a system, method and program product for managing e-mails from a source suspected of sending spam. The e-mails are received at a firewall or router en route to a mail server. A determination is made whether a source has sent an e-mail which exhibits characteristics of spam. In response, subsequent e-mails from the source destined for the mail server are rate-limiting at the firewall or router such that the firewall or router limits a rate at which the subsequent e-mails are forwarded from the firewall or router to the mail server. The rate is predetermined and less than a maximum rate at which the firewall or router can physically forward e-mails to the mail server absent the rate limit.

According to features of the present invention, a determination is made whether another source has sent another e-mail which exhibits more characteristics of spam than the first said e-mail. In response, subsequent e-mails from this other source are blocked at the firewall or router. The rate limit can be a limit on a number of e-mails per unit of time from the source that will be forwarded from the firewall or router to the mail server. The characteristics of spam include one or more of the following characteristics: key words characteristic of spam, whether the e-mail is HTML type, whether text in the e-mail omits a first or last name of an intended recipient, whether a subject line of the e-mail is blank or includes words characteristic of marketing, whether an identity listed in a "from" field matches a location of a source IP address, whether the e-mail includes colors, whether the e-mail has some text in larger fonts than ordinarily used for noncommercial e-mail, whether multiple e-mails with similar content are addressed to multiple different recipients and originate from a same source IP address, and whether the text is similar to or identical with other e-mails from a same source.

DETAILED DESCRIPTION OF THE PREFERRED EMBODIMENTS

Figure 1:
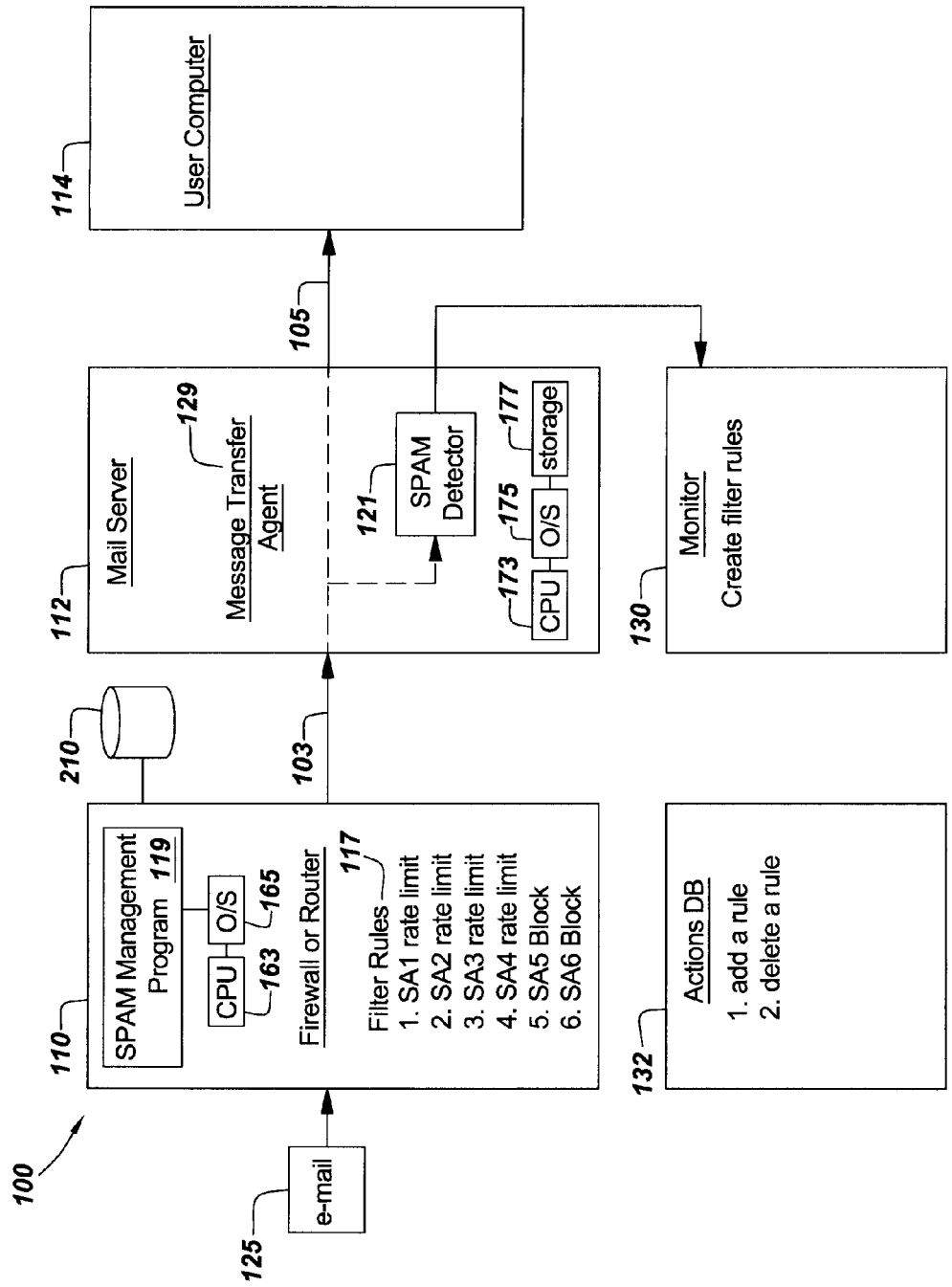
FIG. 1 is a block diagram illustrating a computer system which incorporates the present invention.

The present invention will now be described in detail with reference to the figures. FIG. 1 illustrates a distributed computer system generally designated 100. System 100 comprises a firewall or router 110 and a mail server 112 coupled to the firewall or router 110 via a subnet 103 (or other network). System 100 also comprises a multiplicity of client/user computers such as computer 114 coupled to mail server 112 via a Local Area Network (LAN) 105 (or other network). The firewall or router 110 performs typical functions of known firewalls and known spam blockers such as blocking e-mails with a source address (i.e. the IP address of the sender of the e-mail known) known to be malicious. In addition, in accordance with the present invention, firewall or router 110 "rate-limits" e-mails from source addresses which have sent e-mails that exhibit some characteristics of spam, but the characteristics are not sufficiently definitive of spam to block the source altogether. Firewall or router 110 will not block e-mails from these source IP addresses altogether, because the firewall or router 110 is not reasonably certain that the e-mails are spam. "Rate-limiting" means that the maximum rate at which the e-mails from these IP addresses will be transferred from firewall or router 110 to mail server 112 is less than the maximum rate at which these e-mails could physically be transferred from firewall or router 110 to mail server 112 (absent the rate-limit). Consequently, mail server 112 will not be overwhelmed or bogged down due to an abundance of e-mails from these source IP addresses, and will have resources to quickly handle e-mails from other IP addresses presumed to be legitimate.

In the illustrated embodiment, a spam management program 119 performs both the prior art function of blocking certain source IP addresses known to be sending spam and the new function of rate-limiting certain source IP address which exhibit some characteristics of spammers. Spam management 119 is stored in a storage 210 for execution by CPU 163 under control of operating system 165. When each new e-mail is received, program 119 references a set of filter rules 117 for respective source IP addresses to determine if the e-mail is subject to blocking or rate-limiting. Thus, if the IP address of the source of the e-mail matches one of the filter rules (and the filter rule is still in effect), then program 119 within the firewall or router 110 blocks or rate-limits the e-mail depending on the nature of the filter rule. The example of FIG. 1 illustrates six filter rules - SA1, SA2, SA3, SA4, SA5 and SA6, in firewall or router 110. Filter rules SA1, SA2, SA3 and SA4 are rules for rate-limiting e-mails from four respective source IP addresses (or ranges of source IP addresses) for a finite period of time. Filter rules SA5 and SA6 are rules for blocking e-mails from two respective source IP addresses (or ranges of source IP addresses) for a finite period of time.

The mail server 112 includes a message transfer agent ("MTA") program 129, i.e. a program function which forwards e-mail received from the firewall or router 110 to the intended recipient/user computer such as user computer 114. For example, MTA program 129 can be a Postfix (trademark of Postfix Corporation) mail transfer program. E-mail which is blocked altogether by the spam management program 119 in firewall or router 110 is not forwarded to mail server 112, and so, cannot be not transferred from mail server 112 to the intended recipient. E-mails which are rate limited by the spam management program 119 arrives at mail server 112, but at a finite rate. Nevertheless, when the rate-limited e-mail is received by mail server 112, mail transfer program 129 forwards it rapidly to the intended recipient as if the e-mail originated from a source known to be legitimate. In other words, in the illustrated embodiment, firewall or router 110 performs the rate-limiting, not the mail server 112.

The server 112 also includes a known spam detector program 121 such as "Spam-Assassin" spam detector program or other spam detector program which evaluates characteristics of an e-mail and determines a spam likelihood score. The higher the spam likelihood score the more likely that the e-mail is spam. The spam detector program 121 may be part of the MTA program 129 or a separate program. Spam detector program 121 determines a spam likelihood score for each e-mail based on characteristics of the e-mail and the weight of each characteristic. These characteristics include (a) presence of key words characteristic or marketing material such as "free"and "real-estate", etc. (b) whether the e-mail is HTML type, (c) whether the e-mail is malformed HTML type (which is more characteristic of marketing material than carefully written HTML), (d) whether the e-mail text omits the first or last name of the intended recipient, (e) whether the subject line is blank or has certain words characteristic of marketing, (f) whether the identity listed in the "from" field matches the location of the source IP address, (g) whether the e-mail includes colors, (h) whether the e-mail has some text in larger font than ordinarily used for noncommercial e-mail, and (i) whether the text is similar to or identical with other e-mails from the same source. The spam detector program 121 can also consider whether multiple, similar e-mails (i.e. the same or substantially the same text or the same subject) are addressed to multiple different recipients/users and originate from the same source IP address. The spam detector would ignore e-mails sent from known, legitimate sources, such as e-mails from employees of the same corporation to which the e-mails are sent; these e-mails are not considered to be spam. The legitimate sources may be found in a list supplied by a system administrator, and accessible to the spam detector program. If the spam likelihood score exceeds a predetermined upper threshold, then the e-mail is very likely to be spam. If the spam likelihood score exceeds a predetermined lower threshold but is less than the predetermined upper threshold, then the e-mail may be spam, but the likelihood is not so certain.

Figure 2:
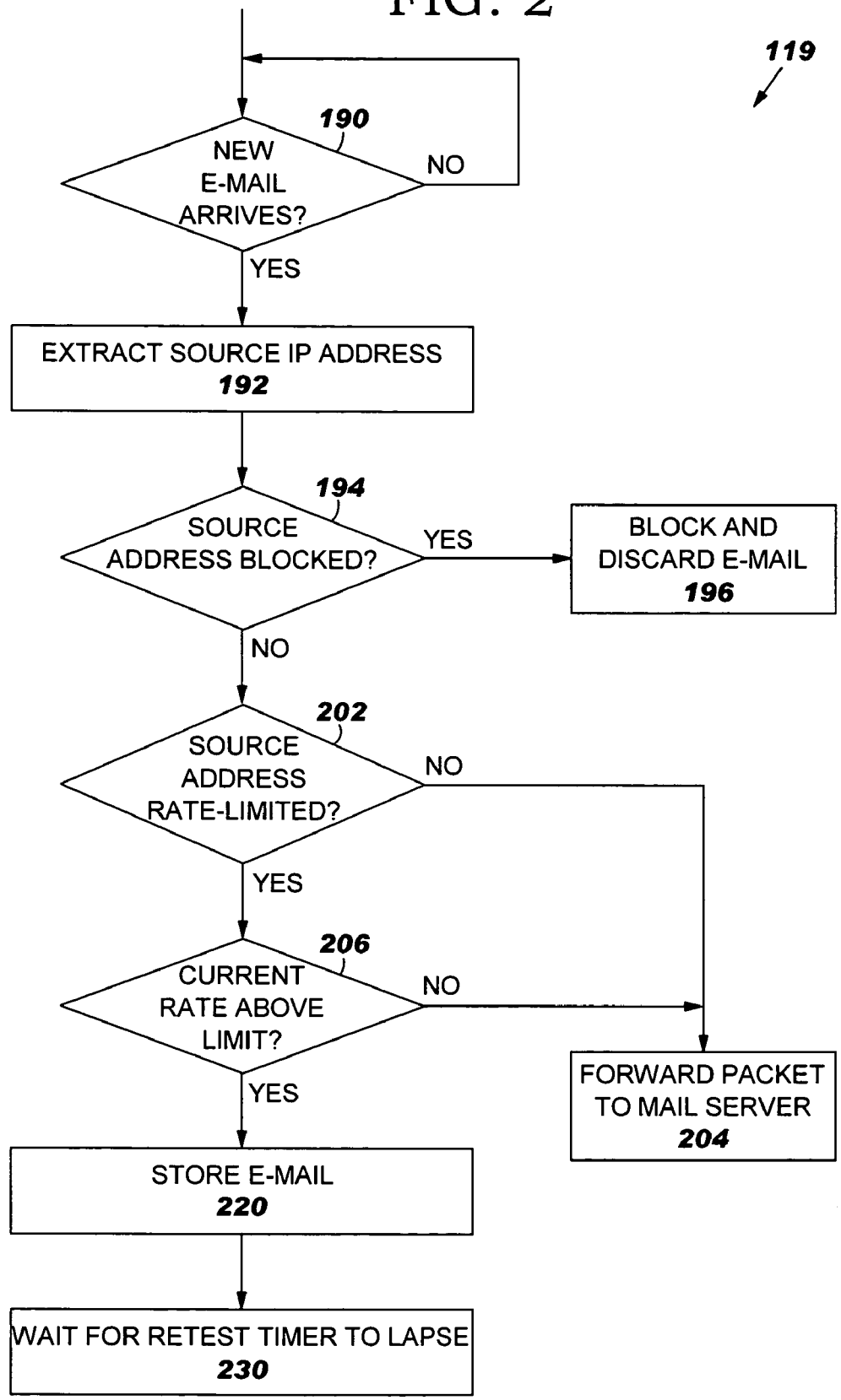
FIG. 2 is a flow chart of a spam management program within a firewall or router of the computer system of FIG. 1, according to the present invention.

FIG. 2 is a flow chart illustrating operation of spam management program 119 in more detail. In step 190, an incoming e-mail 125 is received by the firewall or router 110. In response, the spam management program 119 extracts the source IP address of the incoming e-mail (step 192). Then, spam management program 119 determines if the source IP address of the e-mail matches the source IP address of an active filter rule 117. As explained below, when a blocking or rate-limiting rule is created, it is assigned a start time (which is usually immediate upon creation) and a duration/period during which the blocking or rate-limiting rule is active, i.e. will be enforced. If the source IP address matches an active blocking rule, for example SA5 or SA6 (decision 194, yes branch), then program 119 blocks and discards the e-mail, and does not forward it to mail server 112 (step 196). However, if the source IP address does not match an active blocking rule (decision 194, no branch), then program 119 determines if the source IP address matches an active rate-limiting rule (decision 202). If there is no active, rate-limiting rule (or blocking rule) which matches the source IP address of the current e-mail (decision 202, no branch), then program 119 in firewall or router 110 forwards the packet to mail server 112 (step 204). However, if the source IP address matches an active rate limiting rule, for example, SA1, SA2, SA3 or SA4, then program 119 enforces the rate-limiting specified in the rule such as follows.

In one embodiment of the present invention, program 119 determines if the current incoming rate is above a predetermined rate limit (step 206). For example, the permitted incoming rate may be set to ten e-mails per minute from a respective source IP address. Every time an e-mail is received, its time of arrival is recorded, and program 119 determines how many e-mails were received from this source IP address during the last minute. If there were less than the predetermined rate limit, for example, less than or equal to ten e-mails during the last minute, then the rate limit has not been exceeded, and program 119 forwards the e-mail to mail server 112 (step 204). However, if there were more than the predetermined limit during the last interval, for example, more than ten e-mails during the last minute, then program 119 temporarily stores the current e-mail in storage 210 associated with firewall or router 112 (step 220). Then, after a predetermined retest period elapses (step 230), for example, five minutes, program 119 again checks the current incoming rate, for example, the number of incoming e-mails during the last minute (step 206). If the current rate has not been exceeded during the last interval (decision 206, no branch), for example, less than or equal to ten e-mails during the last minute, then program 119 fetches the e-mail from storage 210 and forwards it to mail server 112 (step 204). However, if the current rate limit has been exceeded decision 206, yes branch), for example, more than ten e-mails during the last minute, then program 119 leaves the e-mail in storage until the next predetermined retest period elapses (steps 220 and 230). The foregoing process defined by steps 190-230 is performed for each incoming e-mail.

In another embodiment of the present invention, for each rate-limited source IP address, one e-mail, if any, per time period is transferred from firewall or router 110 to mail server 112. For example, the time period can be six seconds. (This will permit transfer of ten e-mails per minute from a rate-limited source IP address.) After each such time period, program 119 checks storage 210 for any e-mails from the respective source IP address that have not yet been transferred to mail server 112. If any such e-mails exist in storage 210, then program 119 fetches one and transfers it to mail server 112. When a new e-mail arrives at firewall or router 110 from this source IP address, program 119 checks if it has transferred another e-mail from this source IP address to mail server 112 in the current time period. If not, then program 119 transfers the current e-mail to mail server 112 (and records the time of transfer). If so, then program 119 stores the current e-mail in mail server 112 in a FIFO queue for this source IP address. (There is a separate FIFO queue for each source IP address.) In such a case, the oldest e-mail in the queue (for each source IP address) will be transferred to mail server 112 at the end of the current unit of time.

Figure 3:
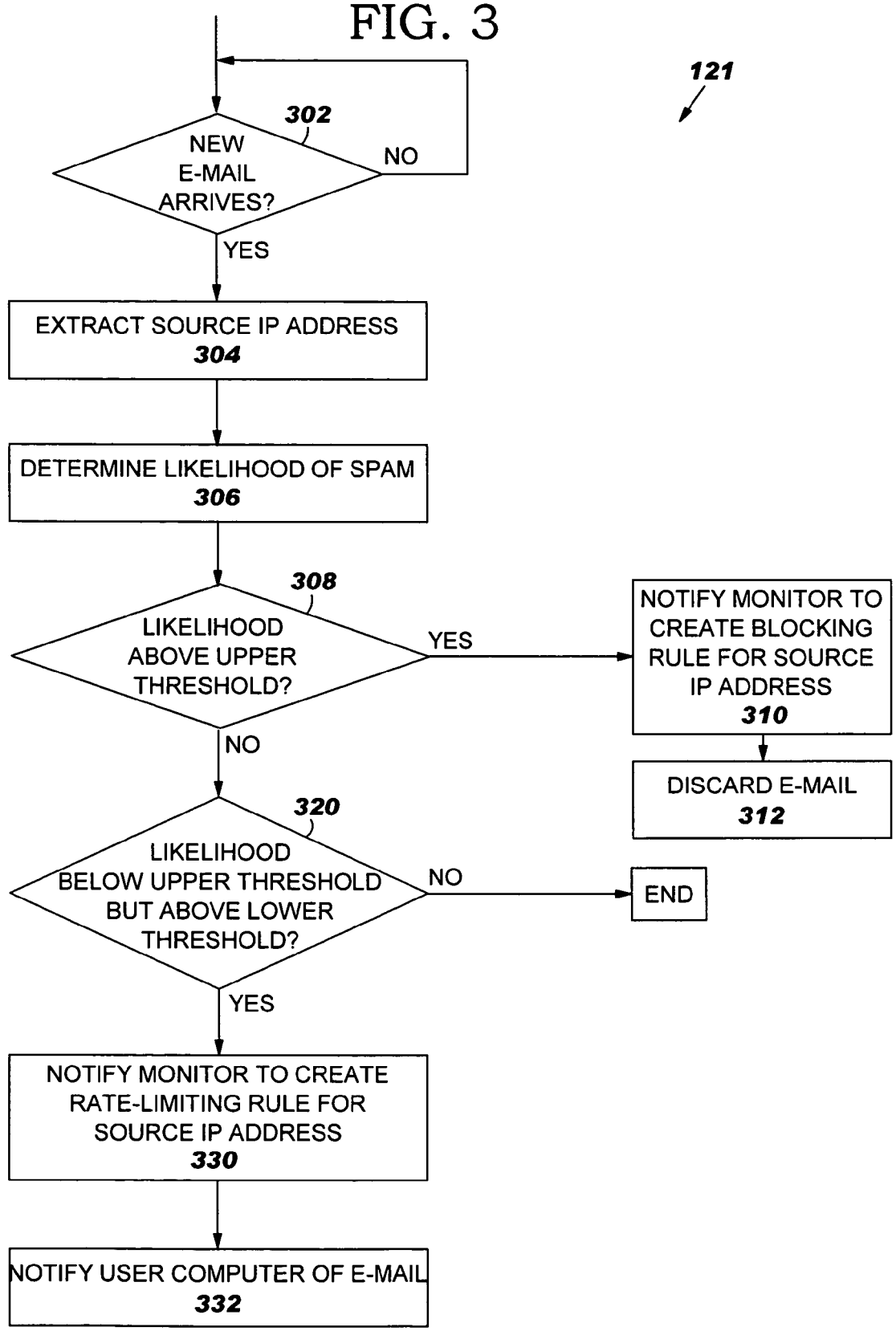
FIG. 3 is a flow chart of a spam detector within a mail server within the computer system of FIG. 1, according to the present invention.

FIG. 3 illustrates processing by spam detector program 121 within mail server 112 in more detail. Spain Detector program 121 is stored in a storage 177 for execution by a CPU 173 under control of an operating system 175. Spam detector program 121 identifies new sources of e-mail which are very likely to be spam and then initiates creation of new, corresponding source-address blocking rules for firewall or router 110. Program 121 also identifies new sources of e-mail where have some lesser characteristics of spam and initiates creation of new, corresponding source-address rate-limiting rules for firewall or router 110. In step 302, a new e-mail arrives at mail server 112 from firewall or router 110. In response, program 121 extracts the source IP address of the e-mail (step 304). Then, program 121 determines the "spam likelihood score" indicating how likely the new e-mail is spam (step 306). If the new e-mail is very likely to be spam, i.e. the spam score exceeds the predetermined upper threshold (decision 308, yes branch), then program 121 notifies a monitor program 130 as to the source IP address of this e-mail and that this source IP address should be blocked (step 310). Also, monitor program 130 discards the e-mail, so user computer 114 is not notified of the e-mail and the e-mail is not forwarded to user computer 114 (step 312). However, if the new e-mail exhibits some lesser characteristics of spam, i.e. the spam score exceeds the predetermined lower threshold but is less than the predetermined upper threshold (decision 308, no branch and decision 320, yes branch), then program 121 notifies monitor program 130 as to the source IP address of this e-mail and that this source IP address should be rate-limited (step 330). Nevertheless, monitor program 130 will still notify user computer 114 of the e-mail and allow transfer of the e-mail to user computer 114 (step 332). (Typically, the e-mail itself is not transferred until the user requests it from the user's "mailbox".) Referring again to decision 320, no branch, where the spam likelihood score is less than the predetermined lower threshold, then program 121 notifies user computer 114 of the e-mail, allows transfer of the e-mail to user computer 114 (step 332) and does not initiate creation of any blocking rule or rate-limiting rule. (Typically, the e-mail itself is not transferred until the user requests it from the user's "mailbox".)

Figure 4:
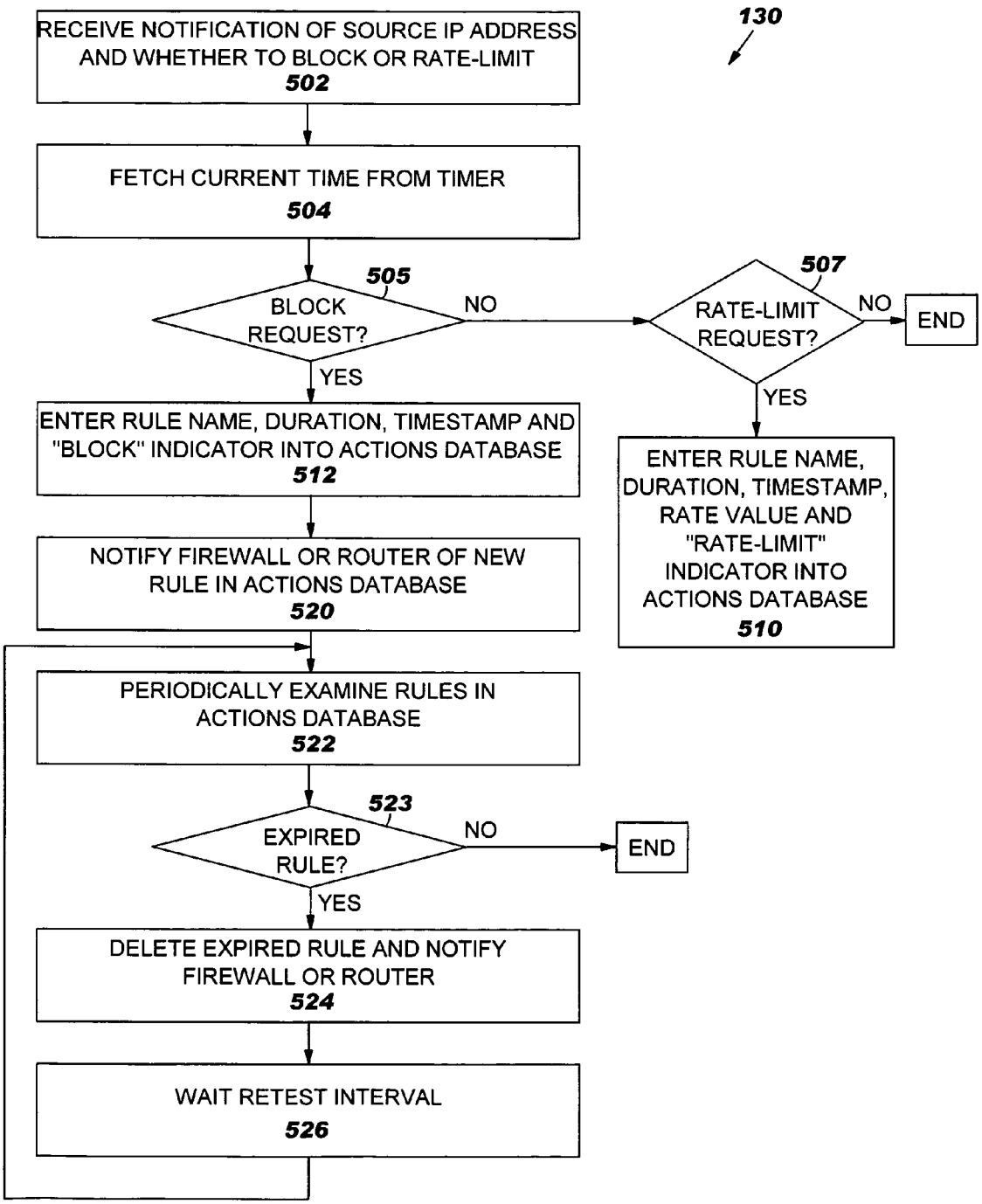
FIG. 4 is a flow chart of a monitor program within the computer system of FIG. 1, according to the present invention.

FIG. 4 illustrates processing by the monitor program 130 for each source IP address identified by spam detector program 121 as a source IP address that should be blocked or rate-limited. The monitor program 130 can reside in server 112 or another server. When resident server 112, monitor program 130 is stored in storage 177 for execution by CPU 173 under control of operating system 175. In step 502, monitor program 130 receives from the spam detector program 121 a notification to block or rate-limit subsequent e-mails from a specified source IP address. In response, monitor program 130 determines the current time (step 504). If the notification is to block the source IP address (decision 505, yes branch), then, the monitor program enters a rule name, current time, rule duration and "block" indicator into an actions database 132 (step 506). The initial duration of the rule is predetermined, such as one minute. Subsequent blocking action of the same type on the same source address might be for a period at least as long as the initial period, such as 10 minutes. Referring again to decision 505, no branch, if the notification is to rate-limit a source IP address (decision 507, yes branch), then the monitor program enters a rule name, current time, rule duration, rate value and a "rate-limit" indicator into the actions database 132 (step 510). The rate value is predetermined, such as one percent of processing capacity on the link. Then, monitor program 132 notifies the firewall or router 110 that a new filter rule has been added to the data base 132 (step 512). In response, the spam management program 119 copies the new filter rule into its group of local filter rules 117. Monitor program 130 periodically reviews the rules in the actions database to identify any rules that have expired (step 522). If any have expired (decision 523, yes branch), then monitor program 130 deletes them from the actions database 132 and notifies spam management program 119 to delete the rule from its local data base 117 (step 524). After a predetermined period elapses (step 526), monitor program 130 repeats steps 520-524.

Based on the foregoing, a spam rate-limiting system, method and program have been disclosed according to the present invention. However, numerous modifications and substitutions can be made without deviating from the scope of the present invention. For example, the foregoing rate-limiting method and system can be applied to instant messaging spam (or SPIM), where an enforcement module is used to rate-limit or block traffic to or from a particular address or subnet. Therefore, the present invention has been disclosed by way of illustration and not limitation, and reference should be made to the following claims to determine the scope of the present invention.

The invention claimed is:

1. A method for managing e-mails, said e-mails being received at a firewall or router en route to a mail server, said method comprising the computer implemented steps of:
   determining a first score indicating an extent to which contents of a first e-mail sent by a first source exhibit characteristics of spam, and in response to said first score exceeding a lower threshold but not exceeding an upper threshold, said firewall or router limiting a rate at which said firewall or router forwards subsequent e-mails from said first source to said mail server, the rate limit being predetermined, greater than zero and less than a maximum rate at which said firewall or router is able to forward said subsequent e-mails from said first source to said mail server absent said rate limit;
   determining a second score indicating an extent to which contents of a second email sent by a second source exhibit characteristics of spam, and in response to said second score exceeding said upper threshold, said firewall or router not forwarding to said mail server subsequent e-mails from said second source destined for said mail server; and
   determining a third score indicating an extent to which contents of a third e-mail sent by a third source exhibit characteristics of spam, and in response to said third score being less than said lower threshold, said firewall or router forwarding subsequent e-mails from said third source to said mail server without blocking or rate-limiting said subsequent e-mails from said third source based on said contents of said third e-mail.

2. A method as set forth in claim 1 wherein scores below said lower threshold indicate that corresponding e-mails are probably not spam, scores above said upper threshold indicate that corresponding e-mails are probably spam, and scores between said lower and upper thresholds indicate that corresponding e-mails have an intermediate likelihood of being spam.

3. A method as set forth in claim 1 wherein said rate limit is a limit on a number of e-mails per unit of time from said first source that will be forwarded from said firewall or router to said mail server.

4. A method as set forth in claim 1 wherein said rate limit is in effect for a predetermined period, and then discontinued such that subsequent e-mails from said first source are not rate-limited based on said contents of said first e-mail.

5. A method as set forth in claim 1 wherein said characteristics of spam include three or more of the following characteristics:
   key words characteristic of spam, whether the e-mail is HTML type, whether text in the e-mail omits a first or last name of an intended recipient, whether a subject line of the e-mail is blank or includes words characteristic of marketing, whether an identity listed in a "from" field matches a location of a source IP address, whether the e-mail includes colors, whether the e-mail has some text in larger fonts than ordinarily used for noncommercial e-mail, whether multiple e-mails with similar content are addressed to multiple different recipients and originate from a same source IP address, and whether the text is similar or identical to other e-mails from a same source.

6. A system for managing e-mails, said e-mails being received at a firewall or router en route to a mail server, said system comprising:
   means for determining a first score indicating an extent to which contents of a first e-mail sent by a first source exhibit characteristics of spam, and in response to said first score exceeding a lower threshold but not exceeding an upper threshold,
   limiting a rate at which said firewall or router forwards said subsequent e-mails from said first source to said mail server, the rate limit being predetermined, greater than zero and less than a maximum rate at which said firewall or router is able to forward e-mails from said first source to said mail server absent said rate limit;
   means for determining a second score indicating an extent to which contents of a second e-mail sent by a second source exhibit characteristics of spam, and in response to said second score exceeding said upper threshold, causing said firewall or router to block from said mail server subsequent e-mails from said second source destined for said mail server; and
   means for determining a third score indicating an extent to which contents of a third e-mail sent by a third source exhibit characteristics of spam, and in response to said third score being less than said lower threshold, allowing said firewall or router to forward subsequent e-mails from said third source to said mail server without blocking or rate-limiting said subsequent e-mails from said third source based on said contents of said third e-mail.

7. A system as set forth in claim 6 wherein scores below said lower threshold indicate that corresponding e-mails are probably not spam, scores above said upper threshold indicate that corresponding e-mails are probably spam, and scores between said lower and upper thresholds indicate that corresponding e-mails have an intermediate likelihood of being spam.

8. A system as set forth in claim 5 wherein said rate limit is a limit on a number of e-mails per unit of time from said first source that will be forwarded from said firewall or router to said mail server.

9. A system as set forth in claim 6 wherein said rate limit is in effect for a predetermined period, and then discontinued such that subsequent e-mails from said first source are not rate-limited based on said contents of said first e-mail.

10. A system as set forth in claim 6 wherein said characteristics of spam include three or more of the following characteristics:
    key words characteristic of spam, whether the e-mail is HTML type, whether text in the e-mail omits a first or last name of an intended recipient, whether a subject line of the e-mail is blank or includes words characteristic of marketing, whether an identity listed in a "from" field matches a location of a source IP address, whether the e-mail includes colors, whether the e-mail has some text in larger fonts than ordinarily used for noncommercial e-mail, whether multiple e-mails with similar content are addressed to multiple different recipients and originate from a same source IP address, and whether the text is similar to or identical with other e-mails from a same source.

11. A computer program product for managing e-mails, said e-mails being received at a firewall or router en route to a mail server, said computer program product comprising:
    one or more computer readable storage media;
    first program instructions to determine a first score indicating an extent to which contents of a first e-mail sent by a first source exhibit characteristics of spam, and in response to said first score exceeding a lower threshold but not exceeding an upper threshold, limit a rate at which said firewall or router forwards subsequent e-mails from said first source to said mail server, the rate limit being predetermined, greater than zero and less than a maximum rate at which said firewall or router is able to forward e-mails from said first source to said mail server absent said rate limit;

second program instructions to determine a second score indicating an extent to which contents of a second e-mail sent by a second source exhibit characteristics of spam, and in response to said second score exceeding said upper threshold, cause said firewall or router to block from said mail server subsequent e-mails from said second source destined for said mail server; and third program instructions to determine a third score indicating an extent to which contents of a third e-mail sent by a third source exhibit characteristics of spam, and in response to said third score being less than said lower threshold, allow said firewall or router to forward subsequent e-mails from said third source to said mail server without blocking or rate-limiting said subsequent e-mails from said third source based on said contents of said third e-mail, and wherein said first, second and third program instructions are recorded on said one or more computer readable storage media.

12. A computer program product as set forth in claim 11 wherein scores below said lower threshold indicate that corresponding e-mails are probably not spam, scores above said upper threshold indicate that corresponding e-mails are probably spam, and scores between said lower and upper thresholds indicate that corresponding e-mails have an intermediate likelihood of being spam.

13. A computer program product as set forth in claim 11 wherein said rate limit is a limit on a number of e-mails per unit of time from said first source that will be forwarded from said firewall or router to said mail server.

14. A computer program product as set forth in claim 11 wherein said rate limit is in effect for a predetermined period, and then discontinued such that subsequent e-mails from said first source are not rate-limited based on said contents of said first e-mail.

15. A computer program product as set forth in claim 11 wherein said characteristics of spam include three or more of the following characteristics:

key words characteristic of spam, whether the e-mail is HTML type, whether text in the e-mail omits a first or last name of an intended recipient, whether a subject line of the e-mail is blank or includes words characteristic of marketing, whether an identity listed in a "from" field matches a location of a source IP address, whether the e-mail includes colors, whether the e-mail has some text in larger fonts than ordinarily used for noncommercial e-mail, whether multiple e-mails with similar content are addressed to multiple different recipients and originate from a same source IP address, and whether the text is similar to or identical with other e-mails from a same source.

* * * * *